United States Patent
Damnjanovic et al.

(10) Patent No.: US 11,641,672 B2
(45) Date of Patent: May 2, 2023

(54) ADAPTIVE ENERGY DETECTION THRESHOLD MEDIUM ACCESS BASED ON DEPLOYMENT AND TRAFFIC TYPE

(71) Applicant: QUALCOMM Incorporated, San Diego, CA (US)

(72) Inventors: Aleksandar Damnjanovic, Del Mar, CA (US); Maarten Menzo Wentink, Nijmegen (NL); Yisheng Xue, San Diego, CA (US); Marco Papaleo, Bologna (IT)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 17/325,816

(22) Filed: May 20, 2021

(65) Prior Publication Data

US 2021/0400730 A1 Dec. 23, 2021

Related U.S. Application Data

(60) Provisional application No. 63/042,367, filed on Jun. 22, 2020.

(51) Int. Cl.
*H04W 74/08* (2009.01)
*H04W 74/00* (2009.01)

(52) U.S. Cl.
CPC ..... *H04W 74/0825* (2013.01); *H04W 74/008* (2013.01); *H04W 74/0858* (2013.01)

(58) Field of Classification Search
CPC ........... H04W 74/008; H04W 74/0825; H04W 74/0858; H04W 74/0808; H04W 84/12; H04W 74/08; H04W 74/00
See application file for complete search history.

(56) References Cited

U.S. PATENT DOCUMENTS

| | | | |
|---|---|---|---|
| 10,455,488 B1* | 10/2019 | Bendlin | H04W 48/16 |
| 11,219,030 B2* | 1/2022 | Sugaya | H04W 72/08 |
| 2008/0008133 A1* | 1/2008 | Zhu | H04W 72/085 370/332 |

(Continued)

FOREIGN PATENT DOCUMENTS

WO WO-2015055243 A1 * 4/2015 .......... H04W 76/028

OTHER PUBLICATIONS

International Search Report and Written Opinion—PCT/US2021/033528—ISA/EPO—dated Sep. 29, 2021.

*Primary Examiner* — Nathan S Taylor
(74) *Attorney, Agent, or Firm* — Danai Nelisile Mhembere; Norton Rose Fulbright LLP

(57) ABSTRACT

Adaptive energy detection (ED) threshold medium access is discussed based on deployment and traffic type. The network nodes sharing a shared communication network are configured with multiple discrete ED thresholds or a range of ED values. As a transmitting node prepares to attempt access to the shared communication spectrum, it identifies an access trigger condition within the network. Such a condition may include traffic type, deployment, or access conditions. In response to detecting an access trigger condition, the transmitting node may select an ED threshold associated with the access trigger condition. Alternatively, upon detection of the access trigger condition, the transmitting node may implement a random ED threshold from the candidate range of ED threshold values.

24 Claims, 8 Drawing Sheets

(56) References Cited

U.S. PATENT DOCUMENTS

| | | | | |
|---|---|---|---|---|
| 2016/0337219 A1* | 11/2016 | Smith | ............... | H04L 1/16 |
| 2017/0048718 A1* | 2/2017 | Kim | ............... | H04L 1/1861 |
| 2018/0049221 A1* | 2/2018 | Park | ............... | H04W 48/20 |
| 2018/0146478 A1* | 5/2018 | Kim | ............... | H04W 76/14 |
| 2018/0152966 A1* | 5/2018 | Goldhamer | ............... | H04W 74/002 |
| 2018/0376339 A1* | 12/2018 | Hu | ............... | H04L 5/0098 |
| 2019/0261412 A1* | 8/2019 | Novlan | ............... | H04W 72/0413 |
| 2019/0313454 A1* | 10/2019 | Pu | ............... | H04W 28/20 |
| 2022/0022050 A1* | 1/2022 | Richards | ............... | H04W 74/08 |
| 2022/0053561 A1* | 2/2022 | Edström | ............... | H04W 74/0816 |
| 2022/0361243 A1* | 11/2022 | Koorapaty | ............... | H04L 1/1812 |

* cited by examiner

ADAPTIVE ENERGY DETECTION THRESHOLD MEDIUM ACCESS BASED ON DEPLOYMENT AND TRAFFIC TYPE

CROSS-REFERENCE TO RELATED APPLICATIONS

This application claims the benefit of U.S. Provisional Patent Application No. 63/042,367, entitled, "ADAPTIVE ENERGY DETECTION THRESHOLD MEDIUM ACCESS BASED ON DEPLOYMENT AND TRAFFIC TYPE," filed on Jun. 22, 2020, which is expressly incorporated by reference herein in its entirety.

BACKGROUND

Field

Aspects of the present disclosure relate generally to wireless communication systems, and more particularly, to adaptive energy detection (ED) threshold medium access based on deployment and traffic type.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes identifying, by a transmitter node, information for transmission on a shared communication channel, identifying, by the transmitter node, for an access trigger condition associated with access of the transmitter node to the shared communication channel, performing, by the transmitter node, an energy detection (ED) procedure for access to the shared communication channel according to an ED threshold of a plurality of candidate ED thresholds corresponding to the access trigger condition, and transmitting, by the transmitter node, the information on the shared communication channel in response to success of the ED procedure.

In an additional aspect of the disclosure, an apparatus configured for wireless communication includes means for identifying, by a transmitter node, information for transmission on a shared communication channel, means for identifying, by the transmitter node, for an access trigger condition associated with access of the transmitter node to the shared communication channel, means for performing, by the transmitter node, an ED procedure for access to the shared communication channel according to an ED threshold of a plurality of candidate ED thresholds corresponding to the access trigger condition, and means for transmitting, by the transmitter node, the information on the shared communication channel in response to success of the ED procedure.

In an additional aspect of the disclosure, a non-transitory computer-readable medium having program code recorded thereon. The program code further includes code to identify, by a transmitter node, information for transmission on a shared communication channel, code to identify, by the transmitter node, for an access trigger condition associated with access of the transmitter node to the shared communication channel, code to performing, by the transmitter node, an ED procedure for access to the shared communication channel according to an ED threshold of a plurality of candidate ED thresholds corresponding to the access trigger condition, and code to transmit, by the transmitter node, the information on the shared communication channel in response to success of the ED procedure.

In an additional aspect of the disclosure, an apparatus configured for wireless communication is disclosed. The apparatus includes at least one processor, and a memory coupled to the processor. The processor is configured to identify, by a transmitter node, information for transmission on a shared communication channel, to identify, by the transmitter node, for an access trigger condition associated with access of the transmitter node to the shared communication channel, to performing, by the transmitter node, an ED procedure for access to the shared communication channel according to an ED threshold of a plurality of candidate ED thresholds corresponding to the access trigger condition, and to transmit, by the transmitter node, the information on the shared communication channel in response to success of the ED procedure.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
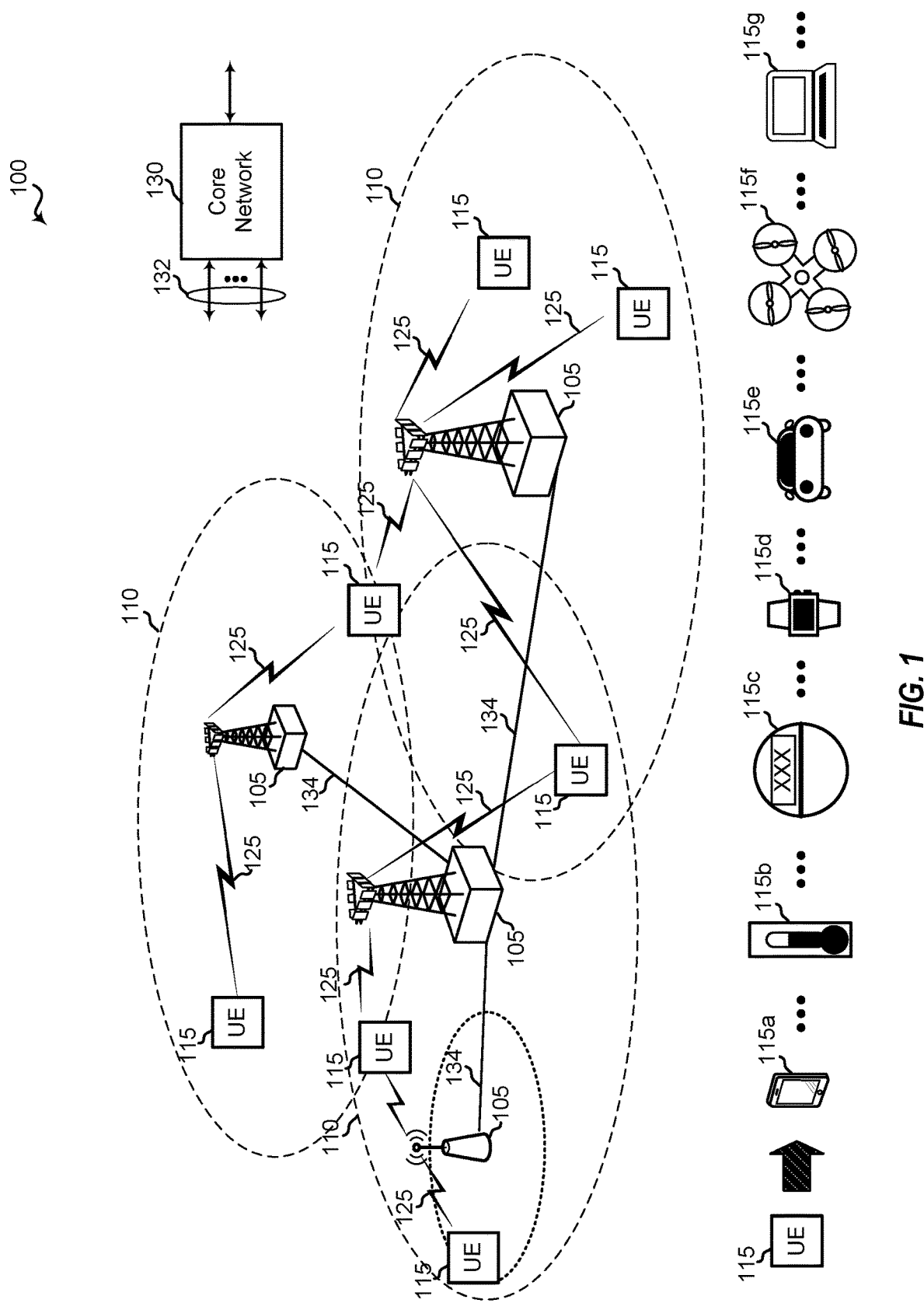
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating an example of a wireless communications system 100 that supports adaptive or dynamic energy detection (ED) threshold medium access based on deployment and traffic type in accordance with aspects of the present disclosure. The network nodes sharing a shared communication network are configured with multiple discrete ED thresholds or a range of ED values. As a transmitting node prepares to attempt access to the shared communication spectrum, it identifies an access trigger condition within the network. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be referred to as forward link transmissions while uplink transmissions may also be referred to as reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and, therefore, provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone (UE 115a), a personal digital assistant (PDA), a wearable device (UE 115d), a tablet computer, a laptop computer (UE 115g), or a personal computer. In some examples, a UE 115 may also refer to a wireless local loop (WLL) station, an Internet-of-things (IoT) device, an Internet-of-everything (IoE) device, an MTC device, or the like, which may be implemented in various articles such as appliances, vehicles (UE 115e and UE 115f), meters (UE 115b and UE 115c), or the like.

Some UEs 115, such as MTC or IoT devices, may be low cost or low complexity devices, and may provide for automated communication between machines (e.g., via machine-to-machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In other cases, UEs 115 may be designed to support critical functions (e.g., mission critical functions), and a wireless communications system 100 may be configured to provide ultra-reliable communications for these functions.

In certain cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling of resources for D2D communications. In other cases, D2D communications may be carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communications system 100 may include operations by different network operating entities (e.g., network operators), in which each network operator may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In various implementations, wireless communications system 100 may use both licensed and unlicensed radio frequency spectrum bands. For example, wireless communications system 100 may employ license assisted access (LAA), LTE-unlicensed (LTE-U) radio access technology, or NR technology in an unlicensed band (NR-U), such as the 5 GHz ISM band. In some cases, UE 115 and base station 105 of the wireless communications system 100 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available.

A CCA may include an energy detection procedure to determine whether there are any other active transmissions on the shared channel. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include message detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In certain implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In additional cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)).

HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot, while in other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier," as may be used herein, refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data.

A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In certain instances, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum, such as NR-shared spectrum (NR-SS)). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In additional cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
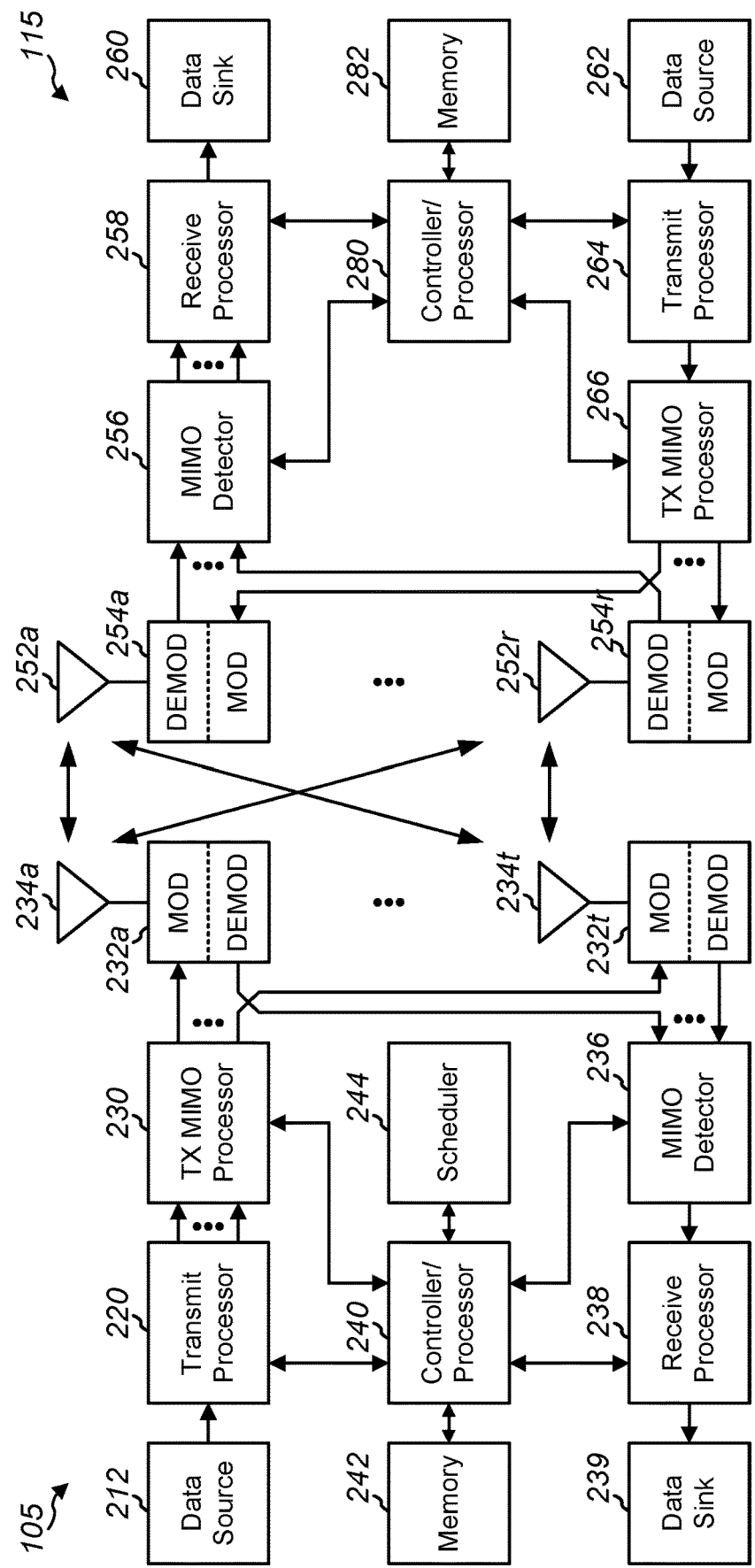
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIG. 4, and/or other processes for the techniques described herein. The memories 242 and 282 may store data and program codes for the base station 105 and the UE 115, respectively. A scheduler 244 may schedule UEs for data transmission on the downlink and/or uplink.

Figure 3:
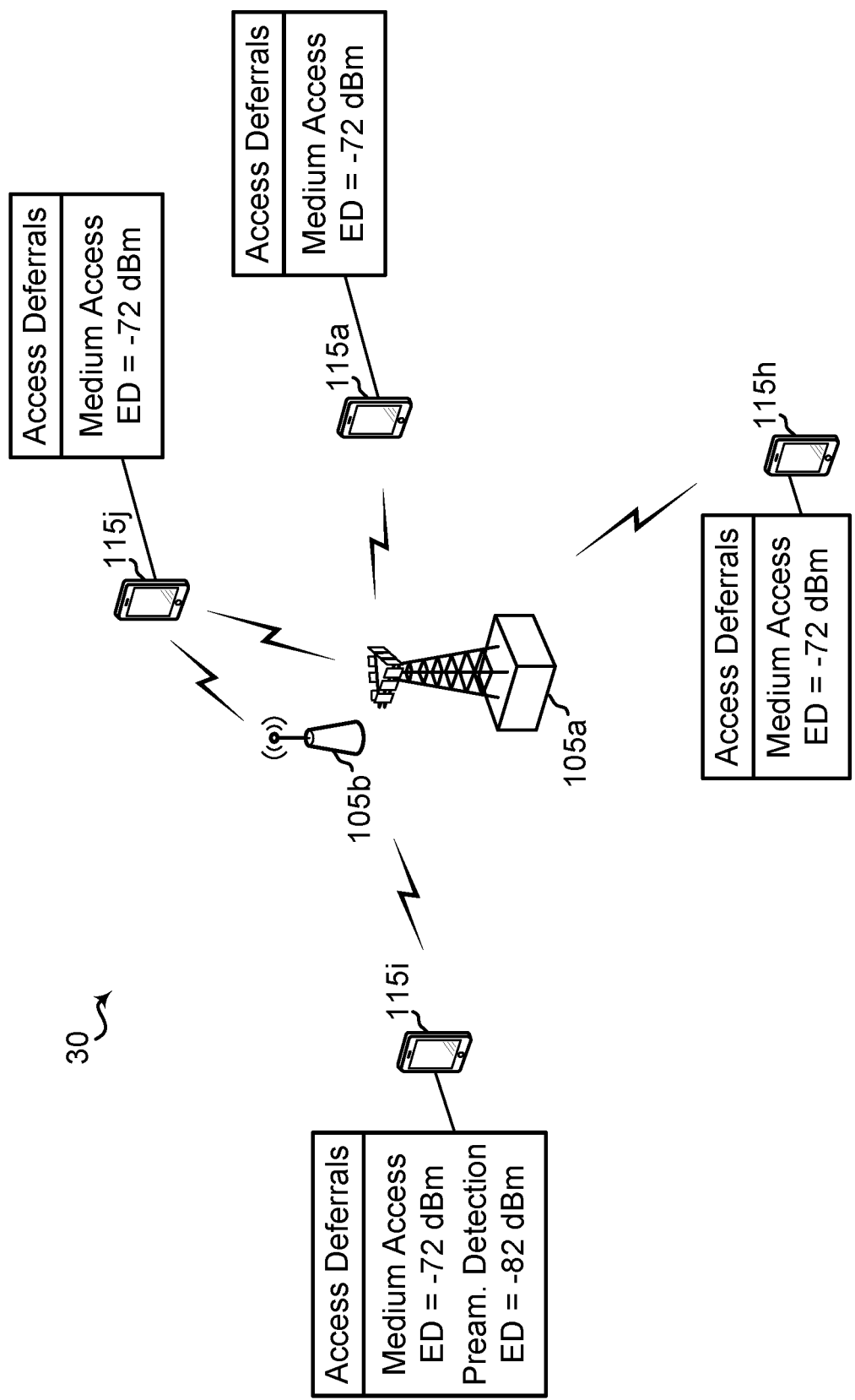
FIG. 3 is a block diagram illustrating a portion of a wireless network having multiple coexisting RATs using a shared communication spectrum.

FIG. 3 is a block diagram illustrating a portion of wireless network 30 having multiple coexisting RATs using a shared communication spectrum. The illustrated portion of wireless network 30 includes NR-U nodes, UE 115a and 115h and base station 105a, which coexists with a WiFi network via WiFi nodes, UE 115i and base station 105b. Base station 105b may also serve NR-U nodes in a license assisted access (LAA) implementation. For example, UE 115j may communicate over licensed spectrum as the anchor carrier with base station 105a and unlicensed NR-U spectrum for a secondary carrier via base station 105b. Each of UEs 115a, 115h, 115i, and 115j also include technology-specific access deferrals. NR-U operations define media access through transmitter sensing. For example, energy detection (ED) has been suggested for the transmitter sensing at a threshold level suitable for unlicensed spectrum. In some proposed implementations, an ED threshold of −72 dBm has been indicated to be suitable for accessing such unlicensed spectrum by NR-U nodes, such as UEs 115a and 115h and base station 105a and for UE 115j for accessing the unlicensed spectrum at base station 105b.

NR-U networks, such as deployed within wireless network 30, may coexist on the same shared communication spectrum with multiple different radio access technologies (RATs), which may have various different access procedures and deferrals, including different ED thresholds or additional ED thresholds for additional access procedures or deferrals. For example, in addition to a medium access ED threshold, WiFi medium access procedures also may rely on a receiver protection procedure through preamble detection and request-to-send (RTS)/clear-to-send (CTS) signaling. Because WiFi nodes, such as UE 115i and base station 105b, additionally defer medium access based on a preamble detection ED threshold at −82 dBm, suggestions have been put forth to increase the access ED threshold for WiFi nodes to −62 dBm.

Different ED thresholds among different technologies can potentially lead to fairness issues in the case of NR-U and WiFi coexistence, which may favor WiFi access over NR-U access. It has been suggested that all RATs accessing a shared communication spectrum should use the same access ED threshold. However, using the same access ED threshold among different technologies can itself lead to fairness issues in the case of NR-U and WiFi coexistence, which may favor NR-U access over WiFi access. Accordingly, the various aspects of the present disclosure are directed to a dynamic ED threshold that may be determined based on an access trigger condition, such as traffic priority, delayed access, error detection, or even geographic considerations, such as indoor location versus outdoor location.

Figure 4:
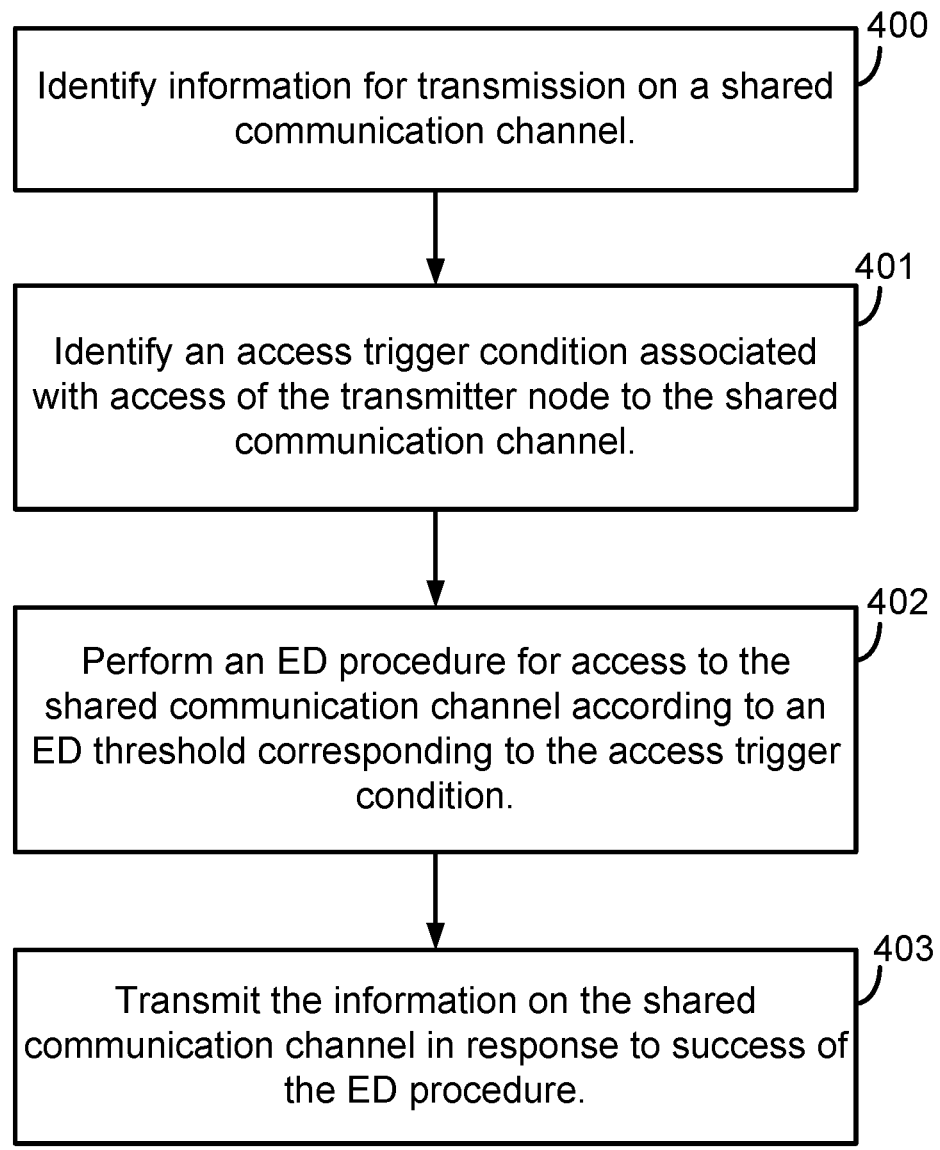
FIG. 4 is a block diagram illustrating example blocks executed to implement one aspect of the present disclosure.
Figure 7:
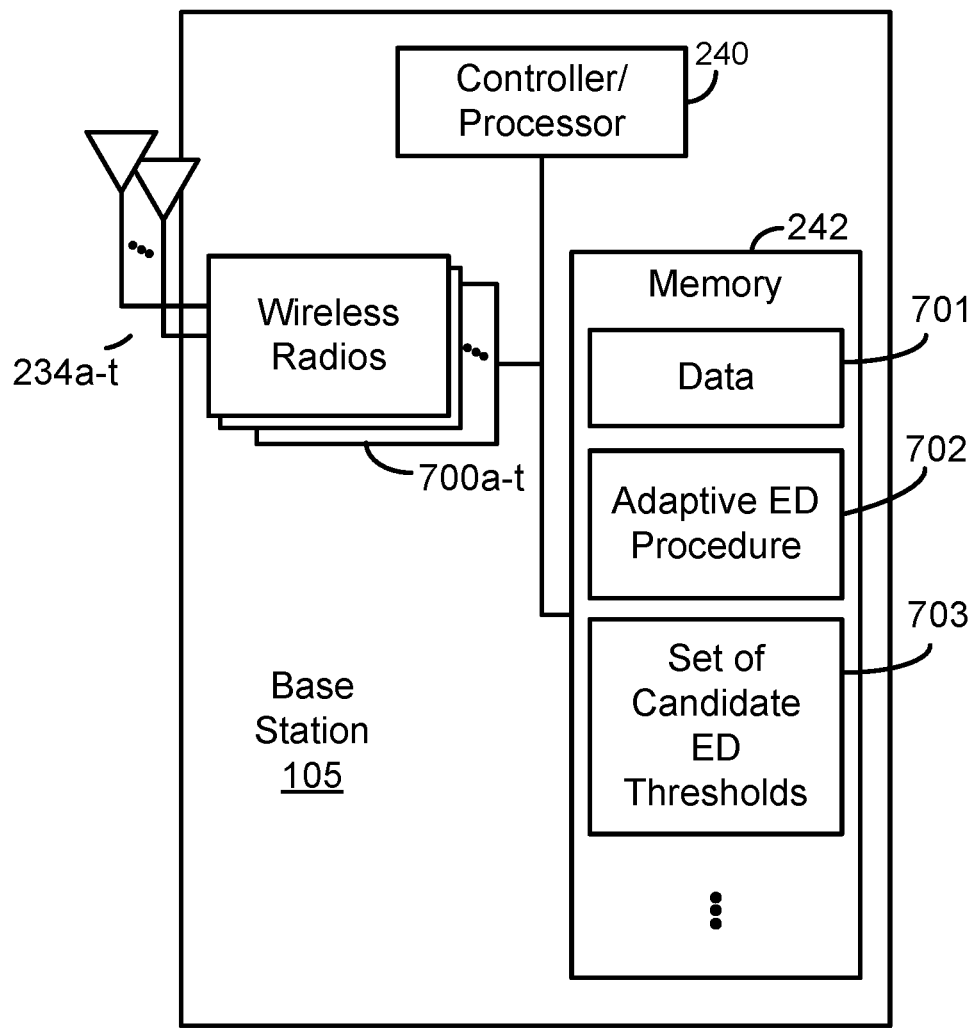
FIG. 7 is a block diagram illustrating an example configuration of a base station configured according to one aspect of the present disclosure.

FIG. 4 is a block diagram illustrating example blocks executed to implement one aspect of the present disclosure. The example blocks will also be described with respect to base station 105 as illustrated in FIGS. 2 and 7. FIG. 7 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 700a-t and antennas 234a-t. Wireless radios 700a-t includes various components and hardware, as illustrated in FIG. 2 for base station 105, including modulator/demodulators 232a-t, MIMO detector 236, receive processor 238, transmit processor 220, and TX MIMO processor 230.

Figure 8:
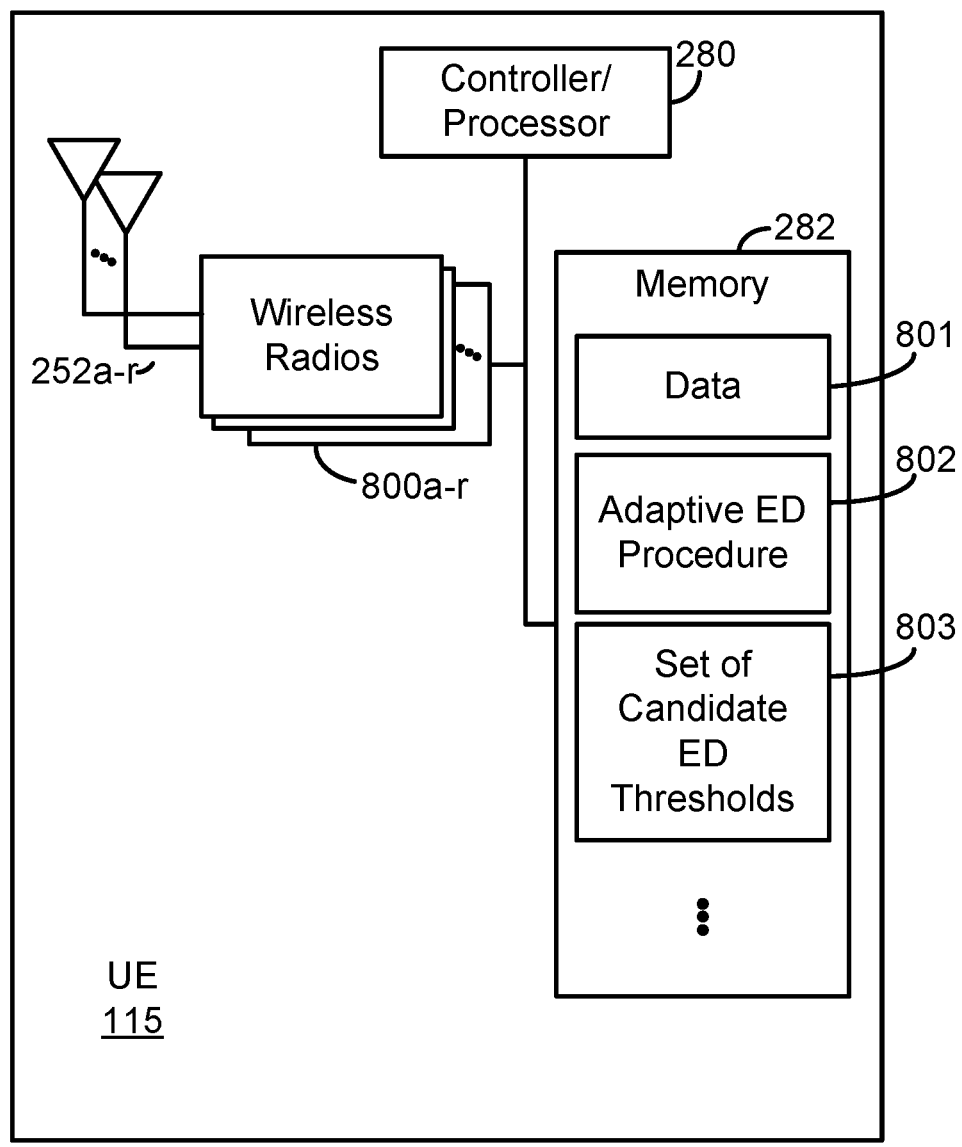
FIG. 8 is a block diagram illustrating an example configuration of a UE configured according to one aspect of the present disclosure.

The example blocks will also be described with respect to UE 115 as illustrated in FIGS. 2 and 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800a-r and antennas 252a-r. Wireless radios 800a-r includes various components and hardware, as illustrated in FIG. 2 for UE 115, including modulator/demodulators 254a-r, MIMO detector 256, receive processor 258, transmit processor 264, and TX MIMO processor 266.

At block 400, a transmitter node identifies information for transmission on a shared communication channel. When the transmitter node is implemented as a base station, such as base station 105, base station 105 may identify either control signaling or data stored in memory 242, at data buffer 701 that are available for downlink transmissions.

When the transmitter node is implemented as a UE, such as UE 115, UE 115 may further identify either reference signals or uplink data in memory 282 at data buffer 801.

At block 401, the transmitter node identifies an access trigger condition associated with access of the transmitter node to the shared communication channel. When the transmitter node is implemented as base station 105, base station 105, under control of controller/processor 240, executes adaptive ED procedure logic 702, stored in memory 242. The additional functionality available to base station 105 that is enabled through the execution of the instructions and logic of adaptive ED procedure logic 702 provides base station 105 with a set of access trigger conditions to identify. Each different access trigger condition may trigger base station 105 to perform an ED procedure for access to the shared communication channel using a particular ED threshold associated with that particular trigger condition. Base station 105 would then identify such access trigger conditions as they occur.

When the transmitter node is implemented as UE 115, UE 115, under control of controller/processor 280, also would execute adaptive ED procedure logic 802, stored in memory 282. The additional functionality available to UE 115 that is enabled through the execution of the instructions and logic of adaptive ED procedure logic 802 provides UE 115 with a set of access trigger conditions to identify. Each different access trigger condition may trigger UE 115 to perform an ED procedure for access to the shared communication channel using a ED threshold associated corresponding to that particular trigger condition. UE 115 would then identify such access trigger conditions as they occur.

At block 402, the transmitter node performs an ED procedure for access to the shared communication channel according to an ED threshold of a plurality of candidate ED thresholds corresponding to the access trigger condition. When the transmitter node is implemented as base station 105, within the execution environment of adaptive ED procedure logic 702, base station 105, under control of controller/processor 240, selects the corresponding ED threshold value in memory 242 at set of candidate ED thresholds 703. Base station 105 performs the ED procedure for accessing the shared communication channel using the selected ED threshold associated with the access trigger condition.

When the transmitter node is implemented as UE 115, within the execution environment of adaptive ED procedure logic 802, UE 115, further under control of controller/processor 280, selects the corresponding ED threshold value in memory 282 at set of candidate ED thresholds 803. UE 115 performs the ED procedure for accessing the shared communication channel using the selected ED threshold associated with the access trigger condition.

At block 403, the transmitter node transmits the information on the shared communication channel in response to success of the ED procedure. When the transmitter node is implemented as base station 105, once base station 105 successfully obtains access to the shared communication channel after the ED procedure, base station 105 will transmit the data or control signaling via wireless radios 700a-t and antennas 234a-t.

When the transmitter node is implemented as UE 115, once UE 115 successfully obtains access to the shared communication channel after the ED procedure, UE 115 will transmit the data or control signaling via wireless radios 800a-r and antennas 252a-r.

Figure 5:
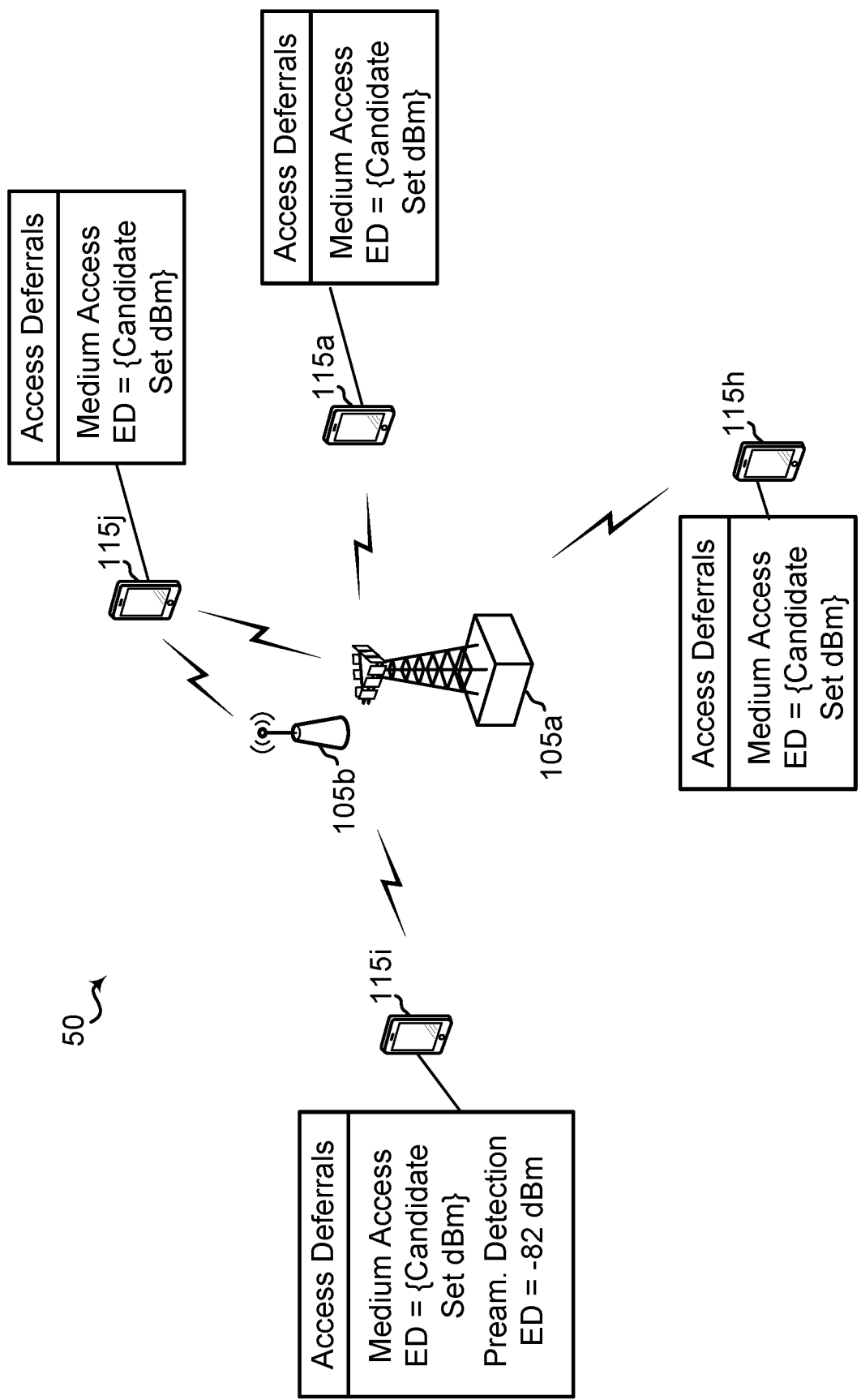
FIG. 5 is a block diagram illustrating a portion of a wireless network having multiple coexisting RATs using a shared communication spectrum with a dynamic ED threshold framework according to one aspect of the present disclosure.

FIG. 5 is a block diagram illustrating a portion of wireless network 50 having multiple coexisting RATs using a shared communication spectrum with a dynamic ED threshold framework according to one aspect of the present disclosure. Current RAT-specific standards generally set a single ED threshold regardless of access condition allowing, instead, a different contention window size or channel occupancy time (COT) to address different traffic priority classes. In the dynamic ED threshold framework according to the various aspects described herein, each network node of all RATs sharing the shared communication spectrum of wireless network 30 may be configured with a set of candidate ED thresholds.

In one example aspect, the dynamic ED threshold framework configures all RATs sharing access to the shared spectrum with multiple discrete ED thresholds. A first such discrete ED threshold reflects a standard ED threshold used by the transmitting node to access the medium under standard conditions (e.g., −N dBm {−70 dBm, −72 dBm, −74 dBm, etc.}). Such standard ED threshold may be common to all transmitting nodes of each RAT for neutral or standard access conditions. A second discrete ED threshold may reflect a relaxed threshold for higher priority traffic or traffic configured with a preference over other traffic. For example, UE 115h may be preparing for ultra-reliability, low-latency communications (URLLC) transmission, which carries a higher traffic priority. Upon detecting this access trigger condition, the transmitting node, UE 115h, may trigger dynamically relaxing the ED threshold. UE 115h would then select the relaxed ED threshold, −X dBm, within the set of candidate ED thresholds (e.g., −X dBm {−60 dBm, −62 dBm, −64 dBm, etc. }).

A third discrete ED threshold may reflect a heightened or strengthened threshold for lower priority traffic or traffic configured with a lower preference relative to other traffic. According to the aspects described herein, where the access trigger condition reflects a lower priority traffic, the transmitting node, according to the example aspects, may tighten or strengthen the ED threshold by selecting the heightened ED threshold, −Y dBm (e.g., −Y dBm {−80 dBm, −82 dBm, −84 dBm, etc. }). For example, UE 115a may be preparing for transmission at a low-priority traffic class. In such case, UE 115a identifies the access trigger condition of low priority traffic and selects the strengthened ED threshold, −Y dBm, for attempting access to the shared medium. Thus, according one example aspect of the illustrated example, the transmitting nodes of wireless network 30 may each be configured with a set of multiple candidate ED thresholds (e.g., −X dBm, −N dBm, −Y dBm). The transmitting node may dynamically select which candidate ED threshold to use based on the observed or detected access trigger condition.

It should be noted that, in the case of the LAA traffic, such as between UE 115j and base station 105b, such traffic may also qualify as lower priority traffic and, thus, trigger selection by UE 115j of the strengthened ED threshold, −Y dBm.

Another optional aspect illustrated in FIG. 5 defines the set of candidate ED thresholds to a range or distribution or even a mean value of available ED thresholds. Thus, instead of a single value, e.g., ED=−N dBm, or set of discrete values, e.g., ED=−X dBm, −N dBm, −Y dBm, a range, distribution, or mean value is specified. For example, ED threshold=range[−Y dBm, −X dBm] or range[−82 dBm, −62 dBm], or with a mean value of ED threshold=−L dBm, where −L dBm may or may not be equal to −(X+Y)/2 dBm. The transmitting node in wireless network 30 may select to implement a random ED threshold from the set of candidate ED thresholds. Therefore, based on the access trigger condition, the transmitting node, such as any of UEs 115a, 115h, 115i, 115j, or base stations 105a or 105b, may select to use a random ED threshold from the identified range.

According to additional aspects of the present disclosure, as illustrated in FIG. 5, the access trigger condition for selecting from the set of candidate ED thresholds may include other conditions associated with the node's previous access or access attempts to the share medium. In one example aspect, a transmitting node, such as UE 115a, may have been attempting to access the shared communication spectrum for a predetermined period of time. When UE 115a determines that it has not been able to successfully access the shared spectrum for the predetermined period of time, it may select a relaxed ED threshold from the set of candidate ED thresholds. In such example aspect, the relaxed ED threshold may increase the likelihood that UE 115a may successfully access the shared spectrum.

The access trigger condition may further relate to current channel conditions that effect the error rate of the node's previous transmissions. For example, if UE 115h has successfully obtained access to the shared medium for transmission, but the error rate for such transmissions exceeded a threshold error rate, UE 115h may select a strengthened ED threshold from the set of candidate ED thresholds. The strengthened ED threshold may result in an decreased error rate on subsequent transmission by backing off when interfering signals are detected at the strengthened ED threshold that may not have been detected at the ED threshold previously used by UE 115h. Such an example aspect may further relate to the allowed COT size. Where the allowed COT size is below a certain length, UE 115h may select the strengthened ED threshold. The access trigger condition for tightening the ED threshold could be detection of errors that also affect contention window size adaption.

Figure 6:
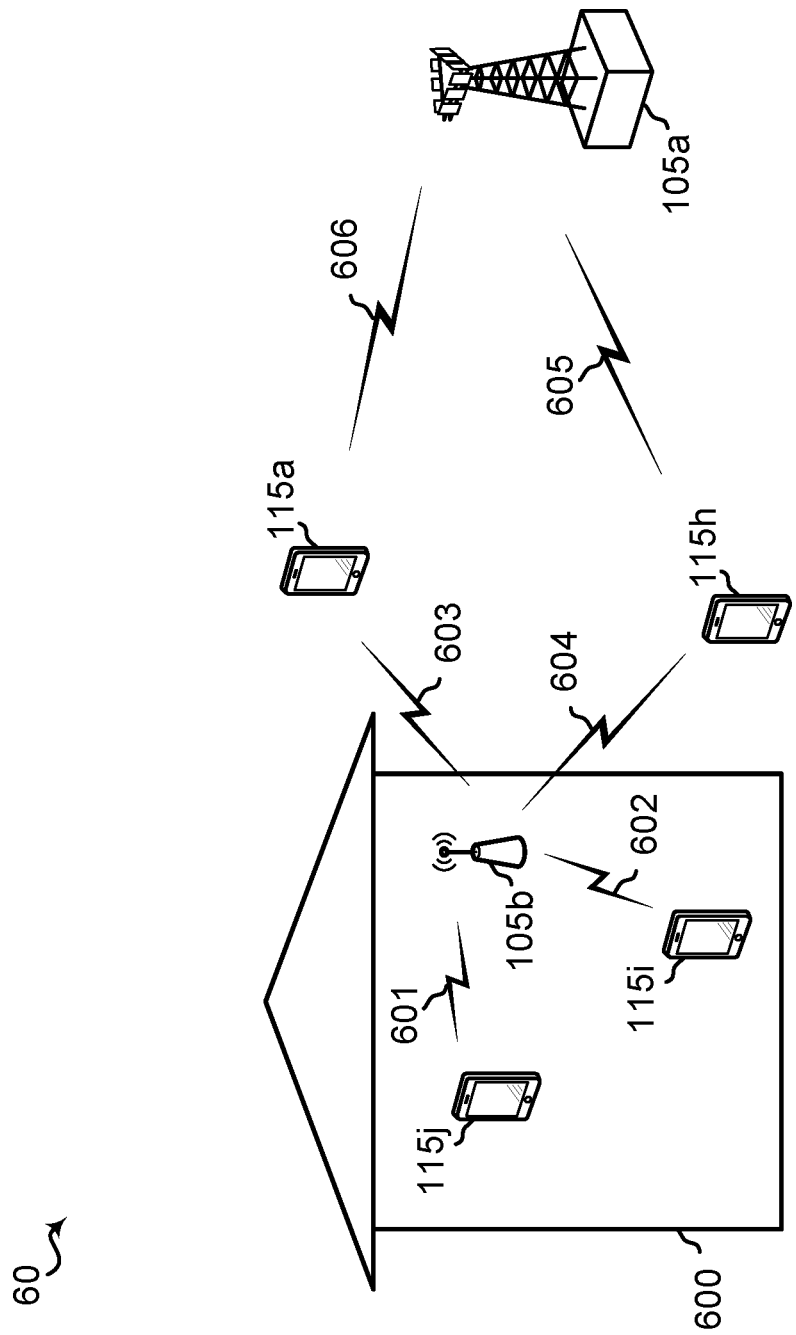
FIG. 6 is a block diagram illustrating a portion of wireless network 60 having multiple coexisting RATs using a shared communication spectrum with a dynamic ED threshold framework according to one aspect of the present disclosure.

FIG. 6 is a block diagram illustrating a portion of wireless network 60 having multiple coexisting RATs using a shared communication spectrum with a dynamic ED threshold framework according to one aspect of the present disclosure. Wireless network 60 includes a base station 105a that facilitates an NR-U network serving NR-U compatible UEs, such as UEs 115a, 115h, and potentially UEs 115i and 115j. Base station 105b is a multiple RAT base station that includes support for WiFi, Bluetooth, and NR-U communications. UEs 115i and 115j are located inside of structure 600 and identified as indoors. UEs 115a and 115h are each located outside of structure 600 and identified as outdoors. The selected ED threshold used by the transmitting nodes in wireless network 60 may be semi-statically selected based on detection deployment of the particular node. For example, indoor deployments, such as UEs 115i and 115j and base station 105b, may select a higher energy threshold value (e.g., a relaxed ED threshold, −X dBm) as the coexistence requirements for such indoor nodes may not be as strict because the owner of structure 600 can control access to who deploys at base station 105b. Conversely, the outdoor deployments, such as UEs 115a and 115h and base station 105a, may select a lower energy threshold value (e.g., a strengthened ED threshold, −Y dBm) as the coexistence requirements may be more stringent, because multiple "operators" may deploy a network covering the same geographical area.

In operation, UEs 115i and 115j may semi-statically select a relaxed ED threshold, −X dBm, from the set of candidate ED thresholds upon detecting the access trigger condition identifying UEs 115i and 115j as indoors. UEs 115a and 115h semi-statically select a strengthened ED threshold, −Y dBm, from the set of candidate ED thresholds upon detecting the access trigger condition identifying UEs 115a and 115h as outdoors. UEs 115i and 115j each use the relaxed ED threshold, −X dBm, for accessing the shared communication spectrum via base station 105b, via ED procedures 601 and 602. If the owner of structure 600 does not wholly excluded any UEs not identified as within structure 600 from accessing base station 105b, UEs 115a and 115h could attempt to access the shared communication spectrum via base station 105b via ED procedures 603 and 604. When each of UEs 115a, 115h, 115i, and 115j attempt to access the shared spectrum via base station 105b, one of the indoor UEs, UEs 115i and 115j, may likely successfully achieve access to the detriment of UEs 115a and 115h, as the indoor nodes use the more relaxed ED threshold, while the outdoor nodes use the strengthened ED threshold. If the outdoor UEs, UEs 115a and 115h fail to access the shared spectrum via base station 105b, they may fall back to attempting access via base station 105a using ED procedures 605 and 606.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 4 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like. A first example aspect configured for wireless communication includes identifying, by a transmitter node, information for transmission on a shared communication channel, identifying, by the transmitter node, for an access trigger condition associated with access of the transmitter node to the shared communication channel, performing, by the transmitter node, an ED procedure for access to the shared communication channel according to an ED threshold of a plurality of candidate ED thresholds corresponding to the access trigger condition, and transmitting, by the transmitter node, the information on the shared communication channel in response to success of the ED procedure.

A second aspect, alone or in combination with the first aspect, wherein the access trigger condition includes one or more of a traffic priority of the information; an inability by the transmitter node to successfully access the shared communication channel for at least a threshold period of time; a threshold error rate detected by the transmitter node, wherein the threshold error rate identifies errors that trigger modification of a contention window size; and a deployment location, wherein the deployment location indicates one of an indoor deployment or an outdoor deployment.

A third aspect, alone or in combination with the first aspect, wherein the plurality of candidate ED thresholds includes one of one or more discrete ED thresholds including at least a standard ED threshold, a relaxed ED threshold, and a tightened ED threshold; or a range of ED thresholds spanning between a most relaxed ED threshold and a most tightened ED threshold.

A fourth aspect, alone or in combination with the third aspect, further including determining, by the transmitter node, an access priority of the access trigger condition, wherein the access priority indicates one of: a higher priority access or a lower priority access; and selecting, by the transmitter node, the ED threshold from the plurality of candidate ED thresholds based on the determined access priority, wherein the transmitter node selects the relaxed ED threshold when the access priority corresponds to the higher priority access, and wherein the transmitter node selects the tightened ED threshold when the access priority corresponds to the lower priority access.

A fifth aspect, alone or in combination with the third aspect, wherein the ED threshold is randomly selected from the range of ED thresholds.

A sixth aspect, alone or in combination with the third aspect, further including failing, by the transmitter node, to detect an access trigger condition, wherein the ED threshold used in the performing the ED procedure includes the standard ED threshold.

A seventh aspect including any combination of the first aspect through the sixth aspect.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   identifying, by a transmitter node, information for transmission on a shared communication channel;
   identifying, by the transmitter node, an access trigger condition associated with access of the transmitter node to the shared communication channel;
   performing, by the transmitter node, an energy detection (ED) procedure for access to the shared communication channel according to an ED threshold selected, by the transmitter node, from among a plurality of candidate ED thresholds that correspond to the access trigger condition and based on an access priority of the access trigger condition, wherein the access trigger condition includes a threshold error rate; and
   transmitting, by the transmitter node, the information on the shared communication channel in response to success of the ED procedure.

2. The method of claim 1, wherein the threshold error rate identifies errors that trigger modification of a contention window size, and wherein the access trigger condition further includes one or more of:
   a traffic priority of the information; and
   an inability by the transmitter node to successfully access the shared communication channel for at least a threshold period of time.

3. The method of claim 1, wherein the plurality of candidate ED thresholds includes one of:
   one or more discrete ED thresholds including at least a standard ED threshold, a relaxed ED threshold, and a tightened ED threshold; or
   a range of ED thresholds spanning between a most relaxed ED threshold and a most tightened ED threshold.

4. The method of claim 3, wherein the ED threshold is randomly selected from the range of ED thresholds.

5. The method of claim 3, further including:
   failing, by the transmitter node, to detect an access trigger condition, wherein the ED threshold used in the performing the ED procedure includes the standard ED threshold.

6. The method of claim 1, further including:
   determining, by the transmitter node, the access priority of the access trigger condition, wherein the access priority indicates one of: a higher priority access or a lower priority access; and
   selecting, by the transmitter node, the ED threshold from the plurality of candidate ED thresholds based on the access priority, wherein the transmitter node selects a relaxed ED threshold when the access priority corresponds to the higher priority access, and wherein the transmitter node selects a tightened ED threshold when the access priority corresponds to the lower priority access.

7. An apparatus configured for wireless communication, comprising:
   means for identifying, by a transmitter node, information for transmission on a shared communication channel;
   means for identifying, by the transmitter node, an access trigger condition associated with access of the transmitter node to the shared communication channel;
   means for performing, by the transmitter node, an energy detection (ED) procedure for access to the shared communication channel according to an ED threshold elected, by the transmitter node, from among a plurality of candidate ED thresholds that correspond to the access trigger condition and based on an access priority of the access trigger condition, wherein the access trigger condition includes a threshold error rate; and
   means for transmitting, by the transmitter node, the information on the shared communication channel in response to success of the ED procedure.

8. The apparatus of claim 7, wherein the threshold error rate identifies errors that trigger modification of a contention window size, and wherein the access trigger condition includes one or more of:
   a traffic priority of the information;

an inability by the transmitter node to successfully access the shared communication channel for at least a threshold period of time;
a deployment location, wherein the deployment location indicates one of an indoor deployment or an outdoor deployment.

9. The apparatus of claim 7, wherein the plurality of candidate ED thresholds includes
one or more discrete ED thresholds including at least a standard ED threshold, a relaxed ED threshold, and a tightened ED threshold.

10. The apparatus of claim 9, further including:
means for failing, by the transmitter node, to detect the access trigger condition, wherein the ED threshold used in the performing the ED procedure includes the standard ED threshold.

11. The apparatus of claim 7, further including:
means for determining, by the transmitter node, the access priority of the access trigger condition, wherein the access priority indicates one of: a higher priority access or a lower priority access; and
means for selecting, by the transmitter node, the ED threshold from the plurality of candidate ED thresholds based on the access priority, wherein the transmitter node selects a relaxed ED threshold when the access priority corresponds to the higher priority access, and wherein the transmitter node selects a tightened ED threshold when the access priority corresponds to the lower priority access.

12. The apparatus of claim 7, wherein the plurality of candidate ED thresholds includes a range of ED thresholds spanning between a most relaxed ED threshold and a most tightened ED threshold, and wherein the ED threshold is randomly selected from the range of ED thresholds.

13. A non-transitory computer-readable medium having program code recorded thereon, the program code comprising:
program code executable by a computer operable to cause the computer to identify, by a transmitter node, information for transmission on a shared communication channel;
program code executable by the computer operable to cause the computer to identify, by the transmitter node, an access trigger condition associated with access of the transmitter node to the shared communication channel;
program code executable by the computer operable to cause the computer to perform, by the transmitter node, an energy detection (ED) procedure for access to the shared communication channel according to an ED threshold selected, by the transmitter node, from among a plurality of candidate ED thresholds that correspond to the access trigger condition and based on an access priority of the access trigger condition, wherein the access trigger condition includes a threshold error rate; and
program code executable by the computer operable to cause the computer to transmit, by the transmitter node, the information on the shared communication channel in response to success of the ED procedure.

14. The non-transitory computer-readable medium of claim 13, wherein the threshold error rate identifies errors that trigger modification of a contention window size, and wherein the access trigger condition further includes
an inability by the transmitter node to successfully access the shared communication channel for at least a threshold period of time.

15. The non-transitory computer-readable medium of claim 14, further including:
program code executable by the computer operable to cause the computer to fail, by the transmitter node, to detect the access trigger condition, wherein the ED threshold used in the performing the ED procedure includes a standard ED threshold.

16. The non-transitory computer-readable medium of claim 13, wherein the plurality of candidate ED thresholds includes
a range of ED thresholds spanning between a most relaxed ED threshold and a most tightened ED threshold.

17. The non-transitory computer-readable medium of claim 16, wherein the ED threshold is randomly selected from the range of ED thresholds.

18. The non-transitory computer-readable medium of claim 13, further including:
program code executable by the computer operable to cause the computer to determine, by the transmitter node, the access priority of the access trigger condition, wherein the access priority indicates one of: a higher priority access or a lower priority access; and
program code executable by the computer operable to cause the computer to select, by the transmitter node, the ED threshold from the plurality of candidate ED thresholds based on the access priority, wherein the transmitter node selects a relaxed ED threshold when the access priority corresponds to the higher priority access, and wherein the transmitter node selects a tightened ED threshold when the access priority corresponds to the lower priority access.

19. An apparatus configured for wireless communication, the apparatus comprising:
at least one processor; and
a memory coupled to the at least one processor,
wherein the at least one processor is configured:
to identify, by a transmitter node, information for transmission on a shared communication channel;
to identify, by the transmitter node, an access trigger condition associated with access of the transmitter node to the shared communication channel;
to perform, by the transmitter node, an energy detection (ED) procedure for access to the shared communication channel according to an ED threshold selected, by the transmitter node, from among a plurality of candidate ED thresholds corresponding to the access trigger condition and based on an access priority of the access trigger condition, wherein the access trigger condition includes a threshold error rate; and
to transmit, by the transmitter node, the information on the shared communication channel in response to success of the ED procedure.

20. The apparatus of claim 19, wherein the threshold error rate identifies errors that trigger modification of a contention window size, and wherein the access trigger condition includes one or more of:
a traffic priority of the information;
an inability by the transmitter node to successfully access the shared communication channel for at least a threshold period of time;
a deployment location, wherein the deployment location indicates one of an indoor deployment or an outdoor deployment.

21. The apparatus of claim 20, wherein the plurality of candidate ED thresholds includes one of:

one or more discrete ED thresholds including at least a standard ED threshold, a relaxed ED threshold, and a tightened ED threshold; or a range of ED thresholds spanning between a most relaxed ED threshold and a most tightened ED threshold.

22. The apparatus of claim 21, wherein the ED threshold is randomly selected from the range of ED thresholds.

23. The apparatus of claim 21, further including configuration of the at least one processor of the transmitter node to fail to detect an access trigger condition, wherein the ED threshold used in the performing the ED procedure includes the standard ED threshold.

24. The apparatus of claim 19, further including configuration of the at least one processor:

to determine, by the transmitter node, the access priority of the access trigger condition, wherein the access priority indicates one of: a higher priority access or a lower priority access; and to select, by the transmitter node, the ED threshold from the plurality of candidate ED thresholds based on the access priority, wherein the transmitter node selects a relaxed ED threshold when the access priority corresponds to the higher priority access, and wherein the transmitter node selects a tightened ED threshold when the access priority corresponds to the lower priority access.

* * * * *